United States Patent
Torikai

(12) 
(10) Patent No.: US 6,587,953 B1
(45) Date of Patent: Jul. 1, 2003

(54) SYSTEM AND METHOD FOR SEQUENTIAL POWER SUPPLY CONTROL OF PRIORITIZED NETWORKED PRINTERS FROM THE HIGHEST PRIORITY VIA A MANUAL SWITCH ON OF A NETWORK PRINTER REGARDLESS OF ITS PRIORITY

(75) Inventor: Kazuya Torikai, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/511,978

(22) Filed: Feb. 24, 2000

(30) Foreign Application Priority Data

Feb. 24, 1999 (JP) .............................. 11-045909

(51) Int. Cl.[7] .............................. G06F 1/26; G06F 1/28; G06F 1/30; G06F 1/32
(52) U.S. Cl. ..................... 713/330; 713/300; 713/310; 713/324; 713/340
(58) Field of Search ................. 713/300, 310, 713/324, 330, 340; 708/173; 358/1.14, 419, 420, 421, 422

(56) References Cited

U.S. PATENT DOCUMENTS 4,312,035 A * 1/1982 Greene ..................... 713/324
4,593,349 A * 6/1986 Chase et al. ................. 713/330
4,680,753 A * 7/1987 Fulton et al. ............... 370/449
5,652,892 A * 7/1997 Ugajin ....................... 713/310
5,901,067 A * 5/1999 Kao et al. ..................... 700/11
6,233,625 B1 * 5/2001 Vander Kamp et al. ...... 710/10

FOREIGN PATENT DOCUMENTS

| JP | 63-65433 | 3/1988 |
| JP | 4-70915 | 3/1992 |
| JP | 6-183102 | 7/1994 |
| JP | 6-337738 | 12/1994 |
| JP | 2000-94794 | 4/2000 |

* cited by examiner

Primary Examiner—Thomas Lee
Assistant Examiner—James K. Trujillo
(74) Attorney, Agent, or Firm—Scully, Scott, Murphy & Presser

(57) ABSTRACT

A remote power-supply control method allowing the burdens on the host computer with power-supply control of a plurality of network printers to be reduced is disclosed. After assigning priorities to the printers, at each of the printers, an address of another printer having a next-lower priority assigned thereto is stored. When a power-supply control signal has been received, the main power supply thereof is controlled depending on the power-supply control signal and the power-supply control signal is sent to the other printer having the next-lower priority assigned thereto.

6 Claims, 8 Drawing Sheets

PRIORITY MANAGEMENT TABLE

| PRIORITY | MAC ADDRESS |
|---|---|
| 1 | 00 00 4C 12 34 11 |
| 2 | 00 00 4C 12 34 56 |
| 3 | 00 00 4C 12 34 23 |
| ... | ... |
| N | 00 00 4C 12 34 36 |

| DESTINATION MAC ADDRESS |
|---|
| SOURCE MAC ADDRESS |
| IP HEADER |
| UDP HEADER |
| DATA |

SYSTEM AND METHOD FOR SEQUENTIAL POWER SUPPLY CONTROL OF PRIORITIZED NETWORKED PRINTERS FROM THE HIGHEST PRIORITY VIA A MANUAL SWITCH ON OF A NETWORK PRINTER REGARDLESS OF ITS PRIORITY

BACKGROUND OF THE INVENTION

1. Field of the Invention

The present invention generally relates to a network system including a plurality of printers and a printer connected to the network system, and in particular to a power-supply control technique for the printers.

2. Description of the Related Art

In a printer system including a host computer and a plurality of printers which are connected to form a network, the power-supply control of the printers is preformed by the host computer through the network.

For example, there have been proposed a printer power-supply control system which can individually control the power supplies of the network printers through the network and indicate the power-on/off state of each printer (see Japanese Patent Unexamined Publication No. 6-183102). Since the network printers can be powered on and off individually and the power-supply state of each printer can be displayed at the side of a host computer, the network printers may be easily managed by the host computer.

In the network system having a plurality of printers of relatively high power consumption, such as laser printers, however, when a plurality of printers are simultaneously powered on, a large amount of rush current flows, which may cause the circuit breaker to open. Further, since the management processing of the network printers is concentrated on the host computer, each network printer cannot be powered on without starting the host computer.

SUMMARY OF THE INVENTION

An object of the present invention is to provide a power-supply control method and a printer system which can prevent a plurality of printers from being simultaneously powered on.

Another object of the present invention is to provide a remote power-supply control method and a printer system allowing easy control operation of the printers in the network system.

Still another object of the present invention is to provide a remote power-supply control method and a printer system allowing efficient control of the printers in the network system.

According to the present invention, the power-supply control of the printers is distributed among the printers.

According to an aspect of the present invention, a main power supply of each of a plurality of printers which are connected to a network is controlled according to the following steps. After assigning priorities to the printers, at each of the printers, an address of another printer having a next-lower priority assigned thereto is stored unless the printer has a lowest priority assigned thereto. When a power-supply control signal has been received, the main power supply thereof is controlled depending on the power-supply control signal and the power-supply control signal is sent to the other printer having the next-lower priority assigned thereto.

The power-supply control signal may be generated at a host computer of the network and then is sent to one of the printers which may be a printer having a highest priority assigned thereto.

Accordingly to another aspect of the present invention, each of the printers stores a first address of a first printer having a highest priority assigned thereto and a second address of a second printer having a next-lower priority assigned thereto. When a power-on request signal has been received, the main power supply thereof is powered on and then the power-on request signal is sent to the second printer having the next-lower priority assigned thereto. When a power switch thereof is switched on, it is determined whether the printer is the first printer and, when the printer is the first printer, then main power supply is powered on and the power-on request signal is sent to the second printer having the next-lower priority assigned thereto. When the printer is not the first printer, the power-on request signal is sent to the first printer having the highest priority assigned thereto.

At each of the printers, preferably, a desired one of a power-on request sending mode and a power-on request non-sending model is selected. When the power-on request non-sending mode is selected, the power-on request signal is not sent in the case where the power switch is switched on.

When the main power supply is powered on, preferably it is determined whether the main power supply thereof is in stable state. When the main power supply thereto is in stable state, the power-supply control signal is sent to the other printer having the next-lower priority assigned thereto.

At a host computer of the network, a priority management table containing addresses of the printers and the respective priorities assigned to the printers is stored. By sequentially selecting the printers, an address of a printer having a next-lower priority than a selected printer is sent to the selected printer. When an acknowledgement is not received from the selected printer within a predetermined time period, an entry of the selected printer may be deleted from the priority management table to update the priority management table.

As described above, according to the present invention, the burdens on the host computer with power-supply control of a plurality of network printers can be reduced.

Further, the printers are sequentially powered on while waiting for power-supply stability according to assigned priorities. Therefore, the printers can be prevented from simultaneously being powered on with reduced burdens on the host computer.

Furthermore, according to the present invention, when any of the printers is manually powered on, the registered printers having lower priorities than the initially powered-on printer are sequentially powered on. Therefore, all the registered printers can be powered on without having to power the highest priority printer on.

DETAILED DESCRIPTION OF THE PREFERRED EMBODIMENTS

First Embodiment

Figure 1:
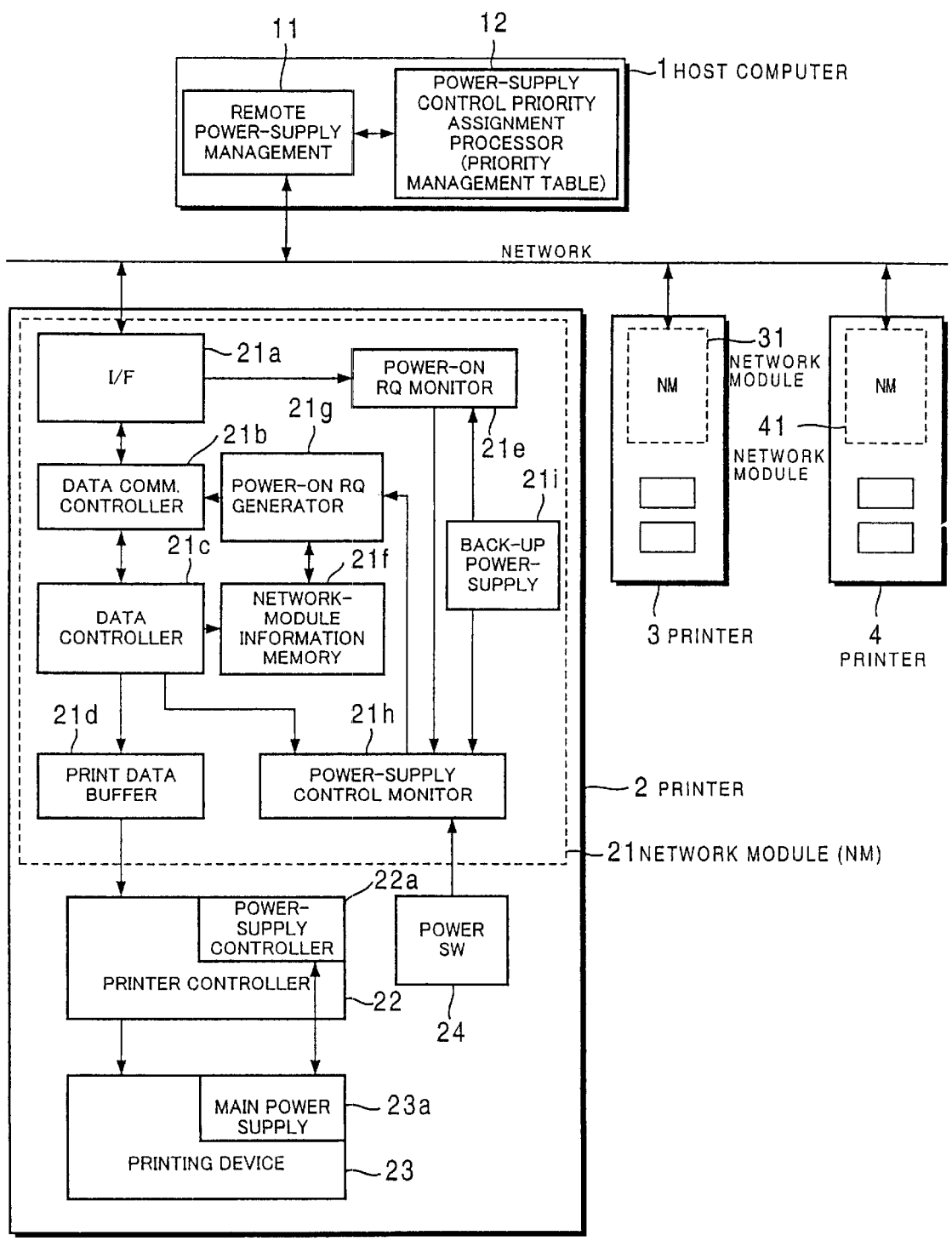
FIG. 1 is a block diagram showing a network system including a remote power-supply control system according to a first embodiment of the present invention.

Referring to FIG. 1, a network is composed of a host computer 1 and a plurality of printers, each of which is controlled by the host computer 1. Here, it is assumed for simplicity that three printers 2–4 are connected to the network.

The host computer 1 has a remote power-supply management section 11 and a power-supply control priority assignment processor 12. The respective printers 2–4 have network modules 21, 31, and 41 connected to the network, allowing the host computer 1 to control the power supply of each printer. Hereafter, taking the printer 2 as an example, the details will be described. It is the same with other printers.

The printer 2 is provided with the network module 21, a printer controller 22, a printing device 23, and a power switch 24. The network module 21 is connected to the network and controls the main power supply of the printer 2 depending on power-supply control data received from the host computer 1 through the network. The printer controller 22 controls the entire operation of the printer 2, including an operation of generating print image data from print data received through the network. The generated print image data is outputted by the printing device 23.

The printing device 23 may include an electrophotographic printer engine. Further, the printing device 23 has a main power supply 23a therein, which supplies power to the electrophotographic printer engine as well as other circuits of the printer 2. The printer controller 22 further includes a power-supply controller 22a which controls the main power supply 23a depending on an instruction received from the network module 21. The power switch 24 is a manual switch which can be operated by a user.

The network module 21 is provided with a data communication interface 21a and a data communication controller 21b which are used for network communication. The data communication interface 21a is an interface to the network for receiving print data and power-supply control data and sending power-supply control data through the network under control of the data communication controller 21b. The power-supply control data is power-supply control information regarding network module, power-on request (RQ), or power-off request(RQ).

The network module 21 is also provided with a data controller 21c which determines whether the power-off request is received and, if it is print data, then the received print data is transferred to a print data buffer 21d. The print data buffer 21d stores the received print data and outputs it to the printer controller 22.

The network module 21 is further provided with a power-on RQ monitor 21e, a network-module (NM) information memory 21f, a power-on RQ generator 21g, a power-supply control monitor 21h, and a backup power supply 21i. The power-on RQ monitor 21e determines whether received data is a power-on request (RQ). When the received data is the power-on request (RQ), the power-on RQ monitor 21e informs the power-supply control monitor 21h of reception of the power-on request.

The network-module (NM) information memory 21f is connected to the data controller 21c and stores network-module (NM) information including address information of another printer connected to the same network under control of the data controller 21c. The NM information to be stored is received from the remote power-supply management section 11 of the host computer 1 through the network. At a power-on RQ instruction from the power-supply control monitor 21h, the power-on RQ generator 21g generates a power-on request to be sent to the other printer using NM information of the other printer inputted from the NM information memory 21f and outputs it to the data communication controller 21b.

The power-supply control monitor 21h monitors the state of the main power supply 23a through the power-supply controller 22a and a change in state of the power switch 24. Further, the power-supply control monitor 21h determines whether a power-on or power-off request is received depending on the outputs of the power-on RQ monitor 21e and the data controller 21c. Depending on these outputs of the power-on RQ monitor 21e and the data controller 21c, the power-supply control monitor 21h controls the power-supply controller 22a of the printer controller 22 and the power-on RQ generator 21g so that the main power supply 23a is powered on or off and the power-on RQ is generated to be sent to the other printer.

The backup power supply 21i is a battery such as a rechargeable battery and supplies power to the power-on RQ monitor 21e and the power-supply control monitor 21h at all times. Therefore, even when the main power supply 23a is in off state, the power-on RQ monitor 21e can monitor reception of the power-on RQ from another printer and the power-supply control monitor 21h can perform the on/off control of the main power supply 23a through the power-supply controller 22a.

Figures 2, 3:
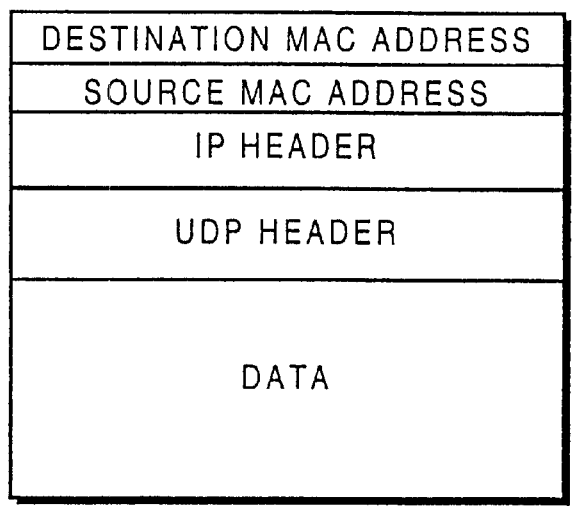
FIG. 2 is a diagram showing a priority management table for network printers in the network system of FIG. 1.
FIG. 3 is a diagram showing a format of UDP/IP power-supply control packet used in the network system of FIG. 1.

Referring to FIG. 2, the power-supply control priority assignment processor 12 of the host computer 1 generates and stores a priority management table. The priority management table has a priority field and a printer identification field. Here, a 6-byte MAC (Media Access Control) address is used to identify a printer. For example, a printer having MAC address "00 00 4C 12 34 11" assigned thereto has a highest priority "1" among the network printers. Similarly, a printer having MAC address "00 00 4C 12 34 56" assigned thereto has a second highest priority "2" and so on.

In the case of the printer 2 having the second highest priority "2", for example, the remote power-supply management section 11 of the host computer 1 determines a printer having the next lower priority by referring to the priority management table of the power-supply control priority assignment processor 12. The MAC address of the determined printer (here, 3 or 4) is sent to the printer 2 and is stored in the NM information memory 21f thereof. The power-on RQ generator 21g generates a power-on request using the MAC address stored in the NM information memory 21f as a destination address and the power-on request is sent to the printer of the MAC address.

As shown in FIG. 3, power-supply control data is transferred as a packet conforming to UDP/IP (User Datagram Protocol/Internet Protocol) between the host computer 1 and the printers 2–4 through the network. UDP/IP is a suite of protocols for communication using IP address similar to TCP/IP (Transmission Control Protocol/Internet Protocol). Also TCP/IP is used for reliable communication, UDP/IP is used for simple communication without the need to guarantee reliable delivery. Since UDP/IP allows the communication process to be simplified, the network is burdened with fewer loads. Further, a UDP/IP packet can be transmitted to a printer which is receiving print data using TCIP/IP. In other words, UDP/IP can provide communication regardless of a communication state of the opposite party.

In FIG. 3, a UDP/IP packet is composed of destination MAC address field for MAC address of a receiving printer, source MAC address field for MAC address of a sending printer, IP header field, UDP header field, and data (message) field.

In the case of power-on request, a power-on request code and destination MAC address indicating a printer to which the power-on request is to be sent are written onto the data field. In the case of power-supply control NM information, a NM information notification code ad a destination MAC address which indicates a printer to which the notification code is to be sent are written onto the data field. In the case of power-off request, a power-off request code is written onto the data field.

Control at Host Computer

Figure 4:
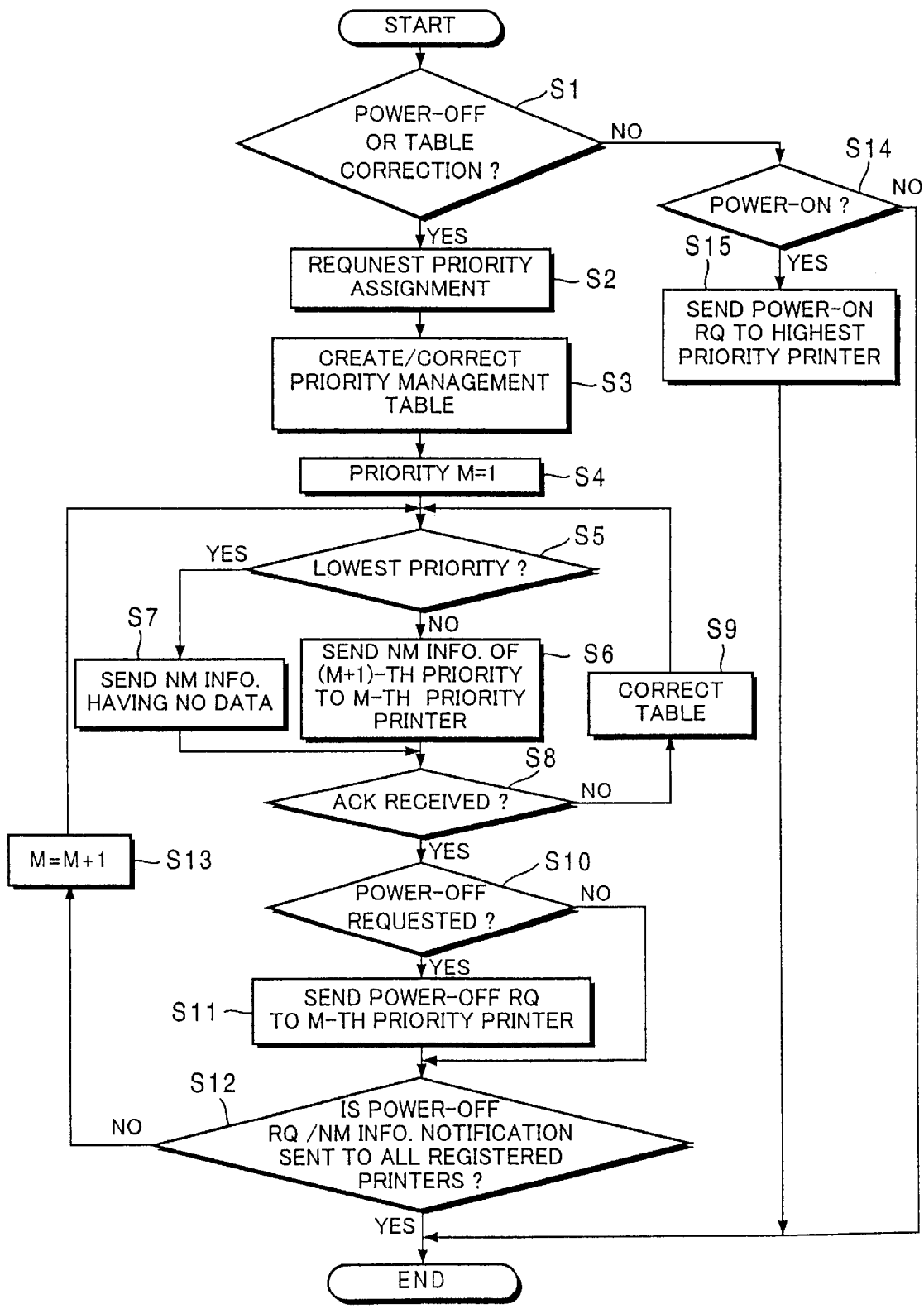
FIG. 4 is a flow chart showing a power-on priority management operation of a host computer in the network system of FIG. 1.

Referring to FIG. 4, first, the host computer 1 determines whether an operator inputs power-off or table correction instruction (step S1). When it is the power-off or table correction instruction (YES at step S1), the remote power-supply management section 11 of the host computer 1 prompts the operator to enter a printer to be subjected to power-supply control and then to assign power-supply control priority to the registered printers displayed on screen in list form (step S2). If a power-supply control priority management table has been created, then the contents of the table may be displayed on screen in order to prompt the operator to correct the priority assignment as necessary. When the operator has assigned power-supply control priority to the registered printers or has corrected the priority assignment, the remote power-supply management section 11 creates a power-supply control priority management table based on the inputted printer and priority assignment or corrects the power-supply control priority management table depending on the corrected priority assignment (step S3).

Thereafter, the remote power-supply management section 11 sets a variable M (M is an integer greater than 0) to 1 (step S4), where M indicates priority (hereinafter, called "priority M"). Priority M=1 indicates the highest priority. Then, the power-supply control priority assignment process 12 searches the priority management table for the priority M and determines whether the priority M is the lowest priority (step S5).

When the priority M is not the lowest priority (NO at step S5), the power-supply control priority assignment processor 12 reads the MAC address of a printer corresponding to the found priority M from the priority management table and outputs it as a destination MAC address to the remote power-supply management section 11, and further reads the MAC address of a printer corresponding to the next lower priority (M+1) from the priority management table and outputs it as NM information to be stored to the remote power-supply management section 11. When receiving the destination MAC address and the NM information to be stored from the power-supply control priority assignment processor 12, the remote power-supply management section 11 sends a UDP/IP packet storing the NM information notification code and the NM information in the data field thereof to the printer having the priority M assigned thereto (step S6). If the priority M is the lowest priority (YES at step S5), the remote power-supply management section 11 sends a UDP/IP packet storing only NM information notification code to the printer having the priority M (step S7).

For example, assuming that the printer 2 of MAC address "00 00 4C 12 34 11" has the highest priority M (=1) assigned thereto and the printer 3 of MAC address "00 00 4C 12 34 56" has the second highest priority M+1 (=2) assigned thereto as shown in FIG. 2, the remote power-supply management section 11 sends the printer 2 a UDP/IP packet storing the NM information notification code and the MAC address "00 00 4C 12 34 56" of the printer 3 in the data field thereof.

After having sent the NM information notification UDP/IP packet to the printer having the priority M assigned thereto, the remote power-supply management section 11 determines whether an acknowledgement is received from the printer having the priority M assigned thereto within a predetermined time period (step S8). If not (NO at step S8), the remote power-supply management section 11 determines that that printer having the priority M assigned thereto is not connected to the network. Therefore, the remote power-supply management section 11 instructs the power-supply control priority assignment processor 12 to delete the registration of that printer from the priority assignment able and correct the priority assignment (step S9). Thereafter, the control goes back to the step S5.

When an acknowledgement is received from the printer having the highest priority M assigned thereto within the predetermined time period (YES at step S8), it is determined whether the instruction at the step S1 is a power-off request (step S10). When it is the power-off request (YES at step S10), the remote power supply management section 11 sends a UDP/IP packet storing the power-off request code in the data field thereof to the printer having the priority M assigned thereto (step S11). When the instruction at the step S1 is not a power-off request (NO at step S10) or when the step S11 has been made, the remote power-supply management section 11 determines whether the NM information notification or the power-off request has been sent to all the registered printers (step S12). If not (NO at step S12), the variable M is incremented by one, that is, the priority is lowered by one (step S13) and the steps S5–S11 are repeatedly performed until the NM information notification/power-off RQ has been sent to all the registered printers.

When it is neither the power-off nor table correction instruction (NO at step S1), the remote power-supply management section 11 determines whether the operator inputs a power-on request (step S14). When it is the power-on request (YES at a step S14), the remote power-supply management section 11 sends a UDP/IP packet storing the power-on RQ code in the data field thereon to the printer having the highest priority assigned thereto (step S15). When it is not the power-on request (NO at step S14), after the step S15 has been made, or when the NM information notification/power-off RQ has been sent to all the registered printers (YES at step S12), the procedure is completed.

Control at Printer

Hereafter, the power-supply control of a printer will be described in the case where the printer has been powered on.

Figure 5:
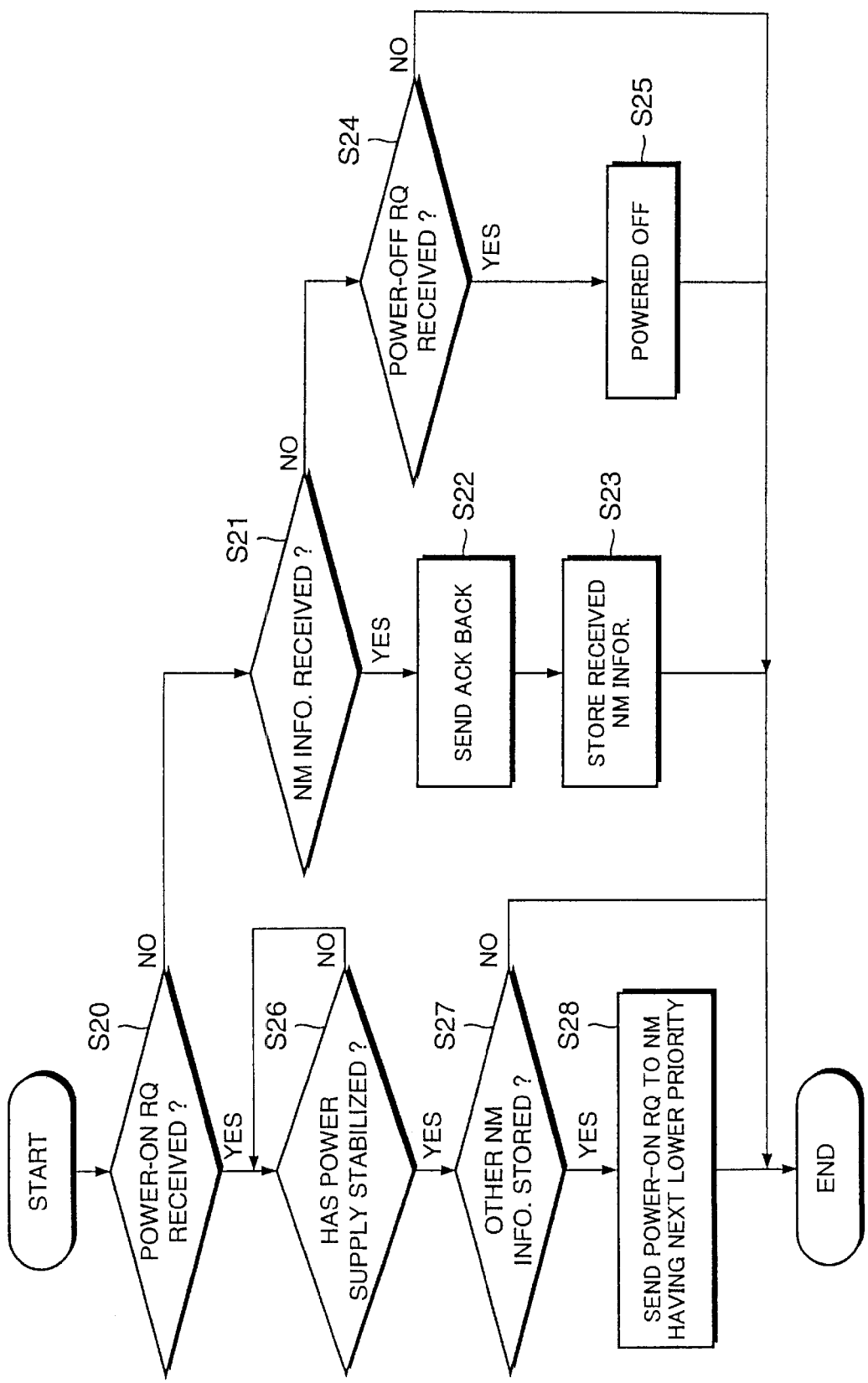
FIG. 5 is a flow chart showing a power-supply control operation of a printer that is in a power-on state.

Referring to FIG. 5, when the data communication interface 21a of a printer receives a UDP/IP packet from the network, the power-on RQ monitor 21e determines whether the data of the received packet includes a power-on request code (step S20). When the received packet is not the power-on request (NO at step S20), the data controller 21c determines whether the data of the received packet includes the NM information notification code (step S21) and, if not (NO at step S21), then further determines whether the data of the received packet includes the power-off request code (step S24).

When the data of the received packet includes the NM information notification code (YES at step S21), the data controller 21c instructs the data communication controller 21b to send an acknowledgement to the host computer 1 through the network (step S22). Thereafter, the data controller 21c stores the NM information included in the data field of the received packet onto the NM information memory 21f (step S23). For example, as described before, the NM information is the MAC address of a printer having the next lower priority than the printer which received the packet. When the data of the received packet does not include the NM information notification code (NO at step S21) but the power-off request code (YES at step S24), the data controller 21c informs the power-supply control monitor 21h of the power-off request and thereby the power-supply control monitor 21h instructs the power-supply controller 22a to power the main power supply 23a off (step S25).

When the data of the received packet includes the power-on request code (YES at step S20), the power-on RQ monitor 21e informs the power-supply control monitor 21h of the power-on request and thereby the power-supply control monitor 21h checks to see that the main power supply 23a operates with stability (step S26). In this case, since the main power supply 23a has been already powered on, the main power supply 23a would be stable (YES at step S26). Then the power-supply control monitor 21h determines whether the NM information memory 21f stores the NM information of another printer (step S27). When the NM information has been stored in the NM information memory 21f, the power-supply control monitor 21h instructs the power-on RQ generator 21g to generate a UDP/IP packet based on the NM information stored in the NM information memory 21f such that the destination MAC address of the UDP/IP packet is the MAC address of the NM information and the data thereof is the power-on request code. Then, the data communication controller 21b sends the power-on RQ packet to the printer of the destination MAC address through the network (step S28). If the NM information memory 21f stores no NM information (NO at step S27), it is determined that the printer itself has the lowest priority assigned thereto and therefore the procedure is terminated without sending the power-on RQ packet to another printer.

Next, the power-supply control of a printer will be described in the case where the printer is powered off. As described before, the power-on RQ monitor 21e and the power-supply control monitor 21h are powered on by the backup power supply 21i such as a battery.

Figure 6:
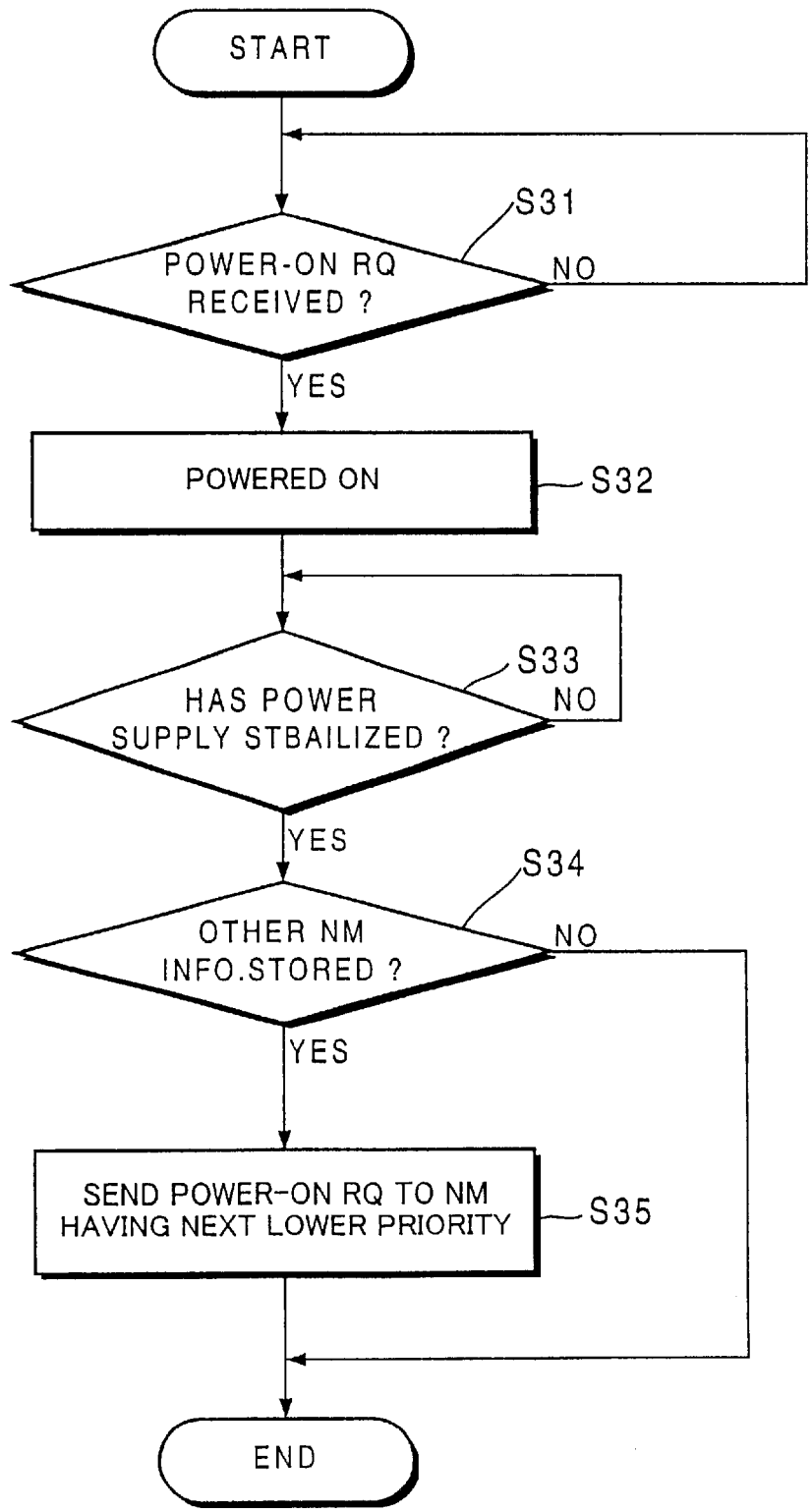
FIG. 6 is a flow chart showing a power-supply control operation of a printer that is in a power-off state.

Referring to FIG. 6, the power-on RQ monitor 21e continues to wait for UDP/IP packet indicating the power-on request (step S31). When the power-on RQ monitor 21e determines that the data of the received packet includes a power-on request code (YES at step S31), the power-on RQ monitor 21e informs the power-supply control monitor 21h of the power-on request and thereby the power-supply control monitor 21h instructs the power-supply controller 22a to switch the main power supply 23a on (step S32). Thereafter, the power-supply control monitor 21h waits until the main power supply 23a operates with stability (step S33). The power-supply stability can be monitored by detecting a ready signal received from the printing device 23. Alternatively, a timer set for a fixed time period required for power-supply stability may be provided and the timeout signal of the timer can be used to detect the power-supply stability.

When the main power supply 23a has been stable (YES at step S33), the power-supply control monitor 21h determines whether the NM information memory 21f stores the NM information of another printer (step S34). When the NM information has been stored in the NM information memory 21f (YES at step S34), the power-supply control monitor 21h instructs the power-on RQ generator 21g to generate a UDP/IP packet based on the NM information stored in the NM information memory 21f such that the destination MAC address of the UDP/IP packet is the MAC address of the NM information and the data thereof is the power-on request code. Then, the data communication controller 21b sends the power-on RQ packet to the printer of the destination MAC address through the network (step S35). If the NM information memory 21f stores no NM information (NO at step S34), it is determined that the printer itself has the lowest priority assigned thereto and therefore the procedure is terminated without sending the power-on RQ packet to another printer.

For example, assuming that the printer 2 of MAC address "00 00 4C 12 34 11" has the highest priority M=1 assigned thereto and the NM information memory 21f of the printer 2 stores the MAC address of the printer 3 "00 00 4C 12 34 56" which has the second highest priority M=2 assigned thereto as shown in FIG. 2. In this case, the printer 2 sends the printer 3 the UDP/IP packet storing the power-on request code in the data field thereof.

The printer 3, when receiving the power-on request UDP/IP packet from the printer 2, performs the same steps S31–S35 and sends the power-on request UDP/IP packet to another printer having the next lower priority than the printer 3. In this manner, the power-on request UDP/IP packet is sequentially sent from a higher-priority printer to a lower-priority printer while waiting for power-supply stability at each printer among the printers registered in the power-supply control priority management table of the host computer 1. Therefore, the registered printers receiving the power-on request UDP/IP packet are sequentially powered on.

Second Embodiment

Figure 7:
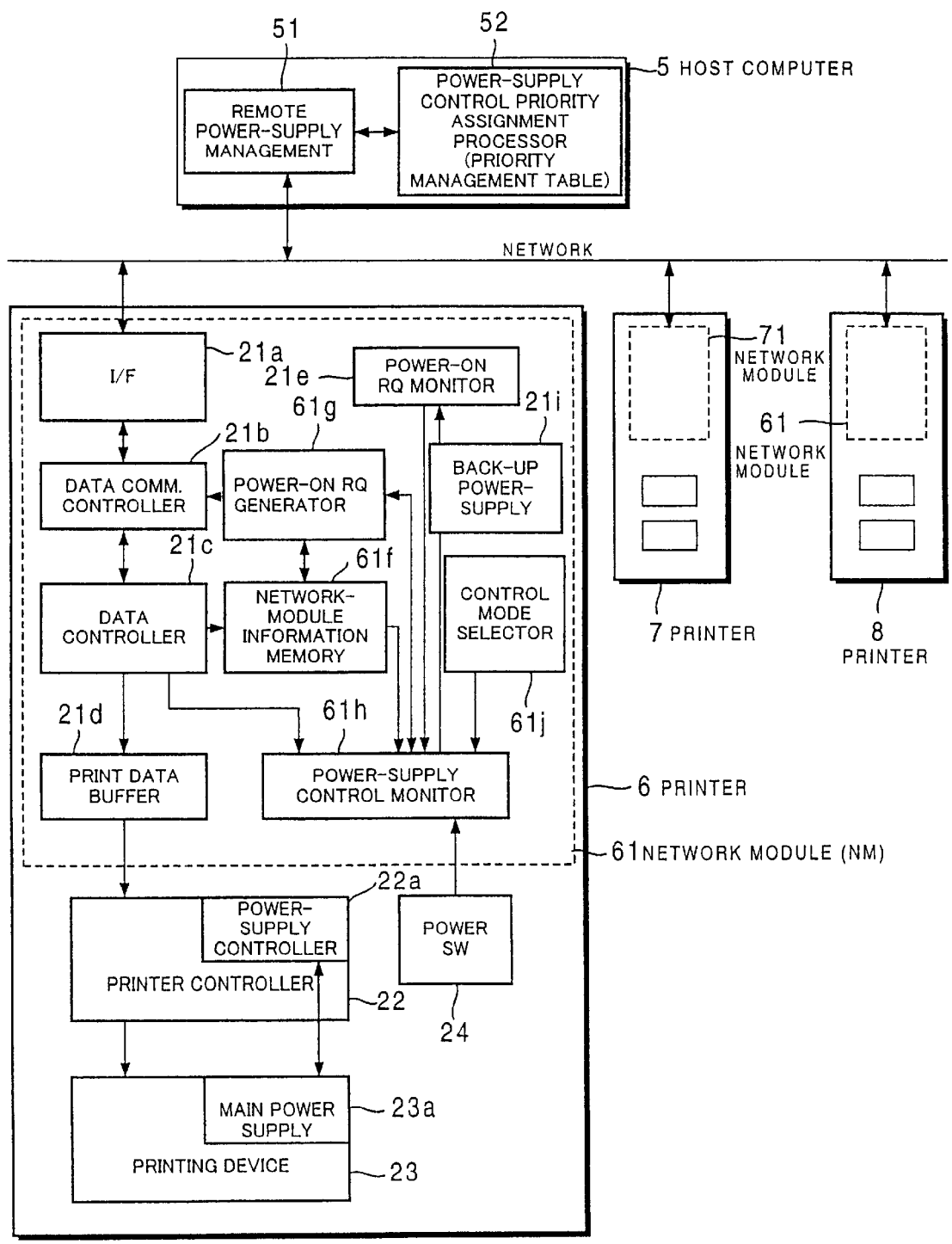
FIG. 7 is a block diagram showing a network system including a remote power-supply control system according to a second embodiment of the present invention.

Referring to FIG. 7, a network is composed of a host computer 5 and a plurality of printers 6, 7, and 8, where circuit blocks similar to those previously described with reference to FIG. 1 are denoted by the same reference numerals and the details thereof will be omitted. The host computer 5 has a remote power-supply management section 51 and a power-supply control priority assignment processor 52 having the priority management table therein. The respective printers 6–8 have network modules 61, 71, and 81 connected to the network, allowing communication with each other.

The remote power-supply management section 51 of the host computer 5 sends each registered printer having a priority assigned thereto (except for the printer having the lowest priority assigned thereto) both NM information of the next-lower priority printer and NM information of the highest priority printer. Only NM information of the highest priority printer is sent to the printer having the lowest priority assigned thereto.

Therefore, at each printer other than the lowest-priority printer, MAC address of the next-lower priority printer and the highest priority printer are stored in the NM information memory 61f. At the lowest-priority printer, only MAC address of the highest priority printer is stored in the NM information memory 61f. Further, the network module of each printer is provided with a control mode selector 61j connected to the power-supply control monitor 61h. The operator can operate the control mode selector 61j to set the printer to a successive power-on mode, which will be described later.

Control at Host Computer

Figure 8:
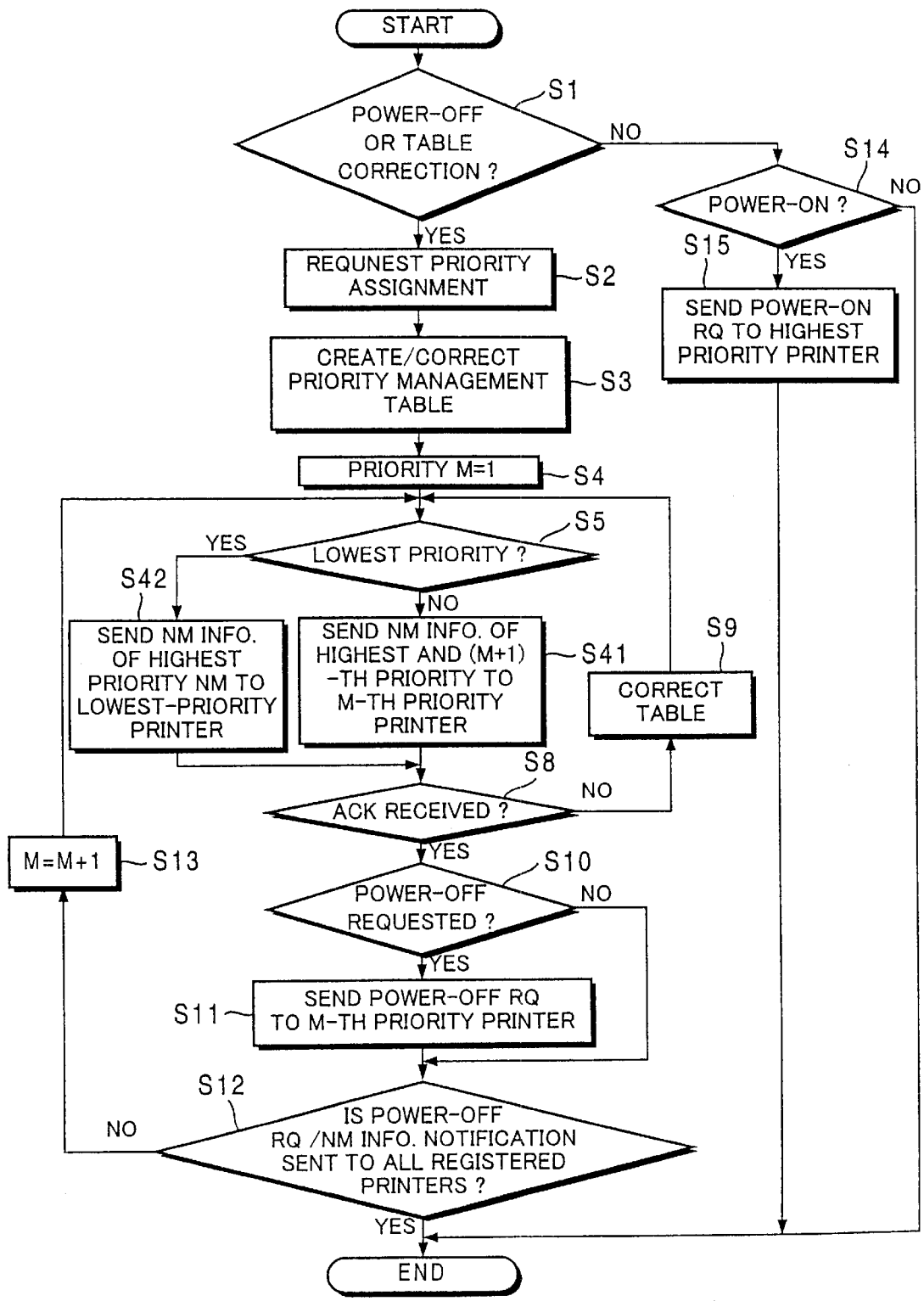
FIG. 8 is a flow chart showing a power-on priority management operation of a host computer in the network system of FIG. 7.

Referring to FIG. 8, the steps S1–S5 are the same operations as in FIG. 5. When the priority M is not the lowest priority (NO at step S5), the power-supply control priority assignment processor 52 reads the MAC address of a printer corresponding to the found priority M from the priority management table and outputs it as sa destination MAC address to the remote power-supply management section 11, and further reads the MAC addresses of a printer corresponding to the next lower priority (M+1) and a printer corresponding to the highest priority from the priority management table and outputs them to the remote power-supply management section 51. When receiving the destination MAC address and the NM information to be stored from the power-supply control priority assignment processor 52, the remote power-supply management section 51 sends a UDP/IP packet storing the NM information notification code and the NM information in the data field thereof to the printer having the priority M assigned thereto (step S41).

If the priority M is the lowest priority (YES at step S5), the remote power-supply management section 51 sends a UDP/IP packet storing NM information notification code and NM information of the highest priority printer to the printer having the priority M (step S42).

Control at Printer

Figure 9:
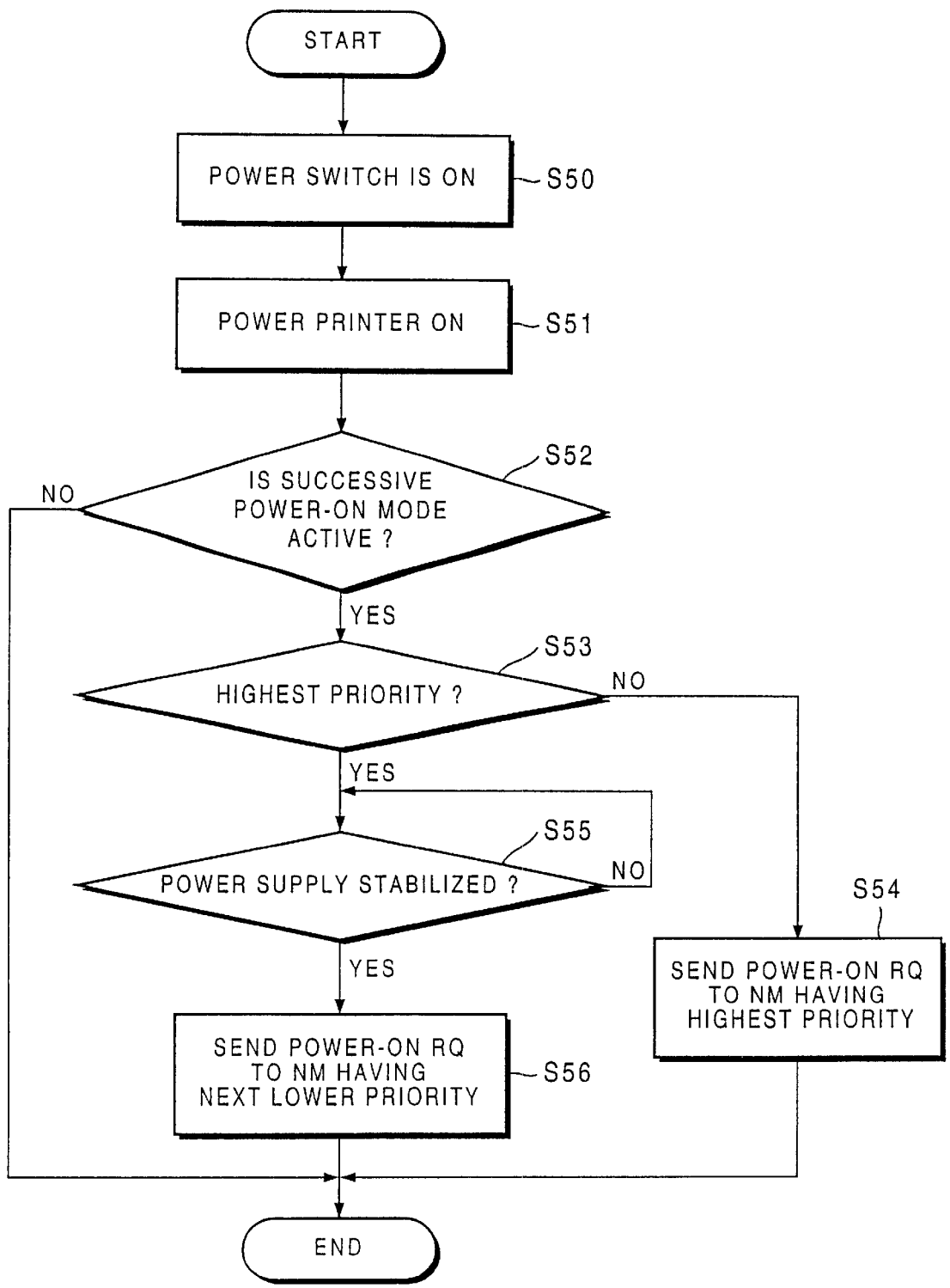
FIG. 9 is a flow chart showing a power-supply control operation of a printer of FIG. 7.

Referring to FIG. 9, when the power switch 24 is on (step S50), the power-supply control monitor 61h instructs the power-supply controller 22a to switch the main power supply 23a on (step S51). Thereafter, the power-supply control monitor 61h determines whether the control mode selector 61j selects the successive power-on mode (step S52). When the control mode selected 61j does not select the successive power-on mode (NO at step S52), this procedure is ended. When the control mode selector 61j selects the successive power-on mode (YES at step S52), the power-supply control monitor 61h determines whether the highest priority is assigned to the printer thereof (step S53).

If it is not the highest priority printer (NO at step S53), the power-supply control monitor 61h instructs the power-on RQ generator 61g to generate a UDP/IP packet based on the NM information of the highest priority printer stored in the NM information memory 61f such that the destination MAC address of the UDP/IP packet is the MAC address of the highest priority printer and the data thereof is the power-on request code. Then, the data communication controller 21b sends the power-on RQ packet to the printer of the destination MAC address through the network (step S54).

If it is the highest priority printer (YES at step S53), the power-supply control monitor 61h waits until the main power supply 23a operates with stability (step S55). The power-supply stability can be monitored by detecting a ready signal received from the printing device 23. Alternatively, a timer set for a fixed time period required for power-supply stability may be provided and the timeout signal of the timer can be used to detect the power-supply stability.

When the main power supply 23a has been stable (YES at step S55), the power-supply control monitor 61h instructs the power-on RQ generator 61g to generate a UDP/IP packet based on the NM information of the next-lower priority printer stored in the NM information memory 21f such that the destination MAC address of the UDP/IP packet is the MAC address of the next-lower priority printer and the data thereof is the power-on request code. Then, the data communication controller 21b sends the power-on RQ packet to the printer of the destination MAC address through the network (step S56).

A printer, which receives the power-on RQ UDP/IP packet from the network, performs the steps S31–S35 as shown in FIG. 6 and sends the power-on request UDP/IP packet to another printer having the next lower priority. In this manner, the power-on request UDP/IP packet is sequentially sent from the highest-priority printer to lower-priority printers while waiting for power-supply stability at each printer among the printers registered in the power-supply control priority management table of the host computer 51. Therefore, the registered printers receiving the power-on request UDP/IP packet are sequentially powered on without the mediation of the host computer 5.

According to the second embodiment, each printer has NM information of the highest priority printer and the next-lower priority printer than the printer. Therefore, when one of the printers is manually powered on which is set to the successive power-on mode, all the registered printers receiving the power-on request UDP/IP packet are sequentially powered on regardless of whether that initially powered printer is the highest priority printer. In the case where the successive power-on mode is not selected, only that printer can be powered on.

The second embodiment can be modified such that a UDP/IP packet including only the NM information of the next lower priority printer is sent to each printer at the step S41 and a UDP/IP packet including no NM information is sent to the lowest priority printer at the step S42. In this case, when one of the printers is manually powered on which is set to the successive power-on mode, the registered printers having lower priorities than the initially powered-on printer are sequentially powered on without the need of determining whether each printer itself is the highest priority printer. In the case where the highest priority printer is identified, all the registered printers can be sequentially powered on.

According to the above first and second embodiments, the power-off request is sequentially sent from the host computer to the printers as shown in FIGS. 4 and 8 and each printer receiving the power-off request is powered off (see step S24 and S25 of FIG. 5).

Alternatively, the power-off request can be sequentially sent from a higher priority printer to a lower priority printer as in the case of the power-on request in the first and second embodiments. More specifically, the host computer 1 or 5 sends the power-off request UDP/IP packet to the highest priority printer. When receiving the power-off request UDP/IP packet, the highest priority printer sends the power-off request UDP/IP packet to the next-lower priority printer by referring to the NM information memory 21f or 61f and then switches the main power supply 23a off. In this manner, the other printers are sequentially powered off while sending the power-off request UDP/IP packet to the next-lower priority printer. Therefore, all the host computer has to do for network printer power-off operation is to send the power-off request UDP/IP packet to the highest priority printer.

As described above, according to the present invention, the burdens on the host computer with power-supply control of a plurality of network printers can be reduced.

Further, the printers are sequentially powered on while waiting for power-supply stability according to assigned priorities. Therefore, the printers can be prevented from simultaneously being powered on with reduced burdens on the host computer.

Furthermore, according to the present invention, when any of the printers is manually powered on, the registered printers having lower priorities than the initially powered-on printers are sequentially powered on. Therefore, all the registered printers can be powered on without having to power the highest priority printer on.

What is claimed is:

1. A method for controlling a main power supply of each of a plurality of printers which are connected to a network, each of the printers having a network module which can control the main power supply thereof, the method comprising the steps of:
   a) assigning priorities to the printers from a highest priority to a lowest priority; at each of the printers,
   b) storing a first address of a first printer having the highest priority assigned and a second address of a second printer having a next-lower priority assigned, the next-lower priority that is lower than a priority of the printer;
   c) determining whether a power-on request signal is received from the network;
   d) powering the main power supply of the printer on when the power-on request signal has been received;
   e) sending the power-on request signal to the second printer having the next-lower priority assigned thereto;
   f) determining whether the printer is the first printer when a power switch of the printer is manually switched on and the power-on request signal has not been received;
   g) powering the main power supply of the printer on, generating the power-on request signal and sending the generated power-on request signal to the second printer having the next-lower priority assigned when the printer manually switched on is the first printer; and
   h) generating a power-on request signal and sending the generated power-on request signal to the first printer having the-highest priority assigned when the printer manually switched on is not the first printer, wherein main power supplies of the plurality of the printers are sequentially powered on according to the assigned priorities without mediation of a host computer.

2. The method according to claim 1, further comprising the steps of:
   at each of the printers,
   i) selecting a desired one of a power-on request sending mode and a power-on request non-sending mode; and
   ii) when the power-on request non-sending mode is selected, in steps g) and h), the power-on request signal is not sent.

3. The method according to claim 1, wherein the step e) comprises the steps of:
   e.1) determining whether the main power supply thereof is in stable state; and
   e.2) when the main power supply thereof is in stable state, sending the power-on request signal to the second printer having the next-lower priority assigned thereto, and the step g) comprises the steps of:
   g.1) determining whether the main power supply thereof is in stable state after powered; and
   g.2) when the main power supply thereof is in stable state, sending the power-on request signal to the second printer having the next-lower priority assigned thereto.

4. The method according to claim 1, wherein the step e) comprises the steps of:
   e.1) determining whether a predetermined time period has elapsed after the main power supply has been powered on; and
   e.2) when the predetermined time period has elapsed, sending the power-on request signal to the second printer having the next-lower priority assigned thereto, and the step g) comprises the steps of:
   g.1) determining whether the predetermined time period has elapsed after the main power supply has been powered on; and
   g.2) when the predetermined time period has elapsed, sending the power-on request signal to the second printer having the next-lower priority assigned thereto.

5. A printer system comprising a host computer and a plurality of printers which are connected to each other via a network, the printer system comprising:
   the host computer that comprises:
      a priority assignment section for assigning priorities to the printers to produce a priority management table containing addresses of the printers and the respective priorities assigned to the printers from a highest priority to a lowest priority; and
      a remote power-supply manager for sending to each printer a first address of a first printer having the highest priority assigned and a second address of a second printer having a next-lower priority assigned, the next-lower priority that is lower than a priority of the printer; and
   each of the printers comprises:
      a main power supply;
      a power-on request detector for receiving the power-on request signal from the network;
      a memory for storing the first address of the first printer having the highest priority assigned and the second address of the second printer having the next-lower priority assigned;
      a controller controlling the main power supply of the printer such that when the power-on request signal has been received from the network, the main power supply is powered on and the power-on request signal is sent to the second printer having the next-lower priority assigned, and when a power switch of the printer is manually switched on and the power-on request signal has not been received, if the printer is the first printer then the main power supply of the printer is powered on, a power-on request signal is generated and the generated power-on request signal is sent to the second printer having the next-lower priority assigned, and if the printer is not the first printer, then a power-on request signal is generated and the generated power-on request signal is sent to the first printer having the highest priority assigned, wherein the main power supplies of the plurality of the printers are sequentially powered on according to the assigned priorities without mediation of the host computer.

6. A printer used in a network including a host computer and a plurality of printers to which priorities are assigned from a highest priority to a lowest priority, the printer comprising:
   a main power supply;
   a power-on request detector for receiving a power-on request signal from the network;

a memory for storing a first address of a first printer having the highest priority assigned and a second address of a second printer having a next-lower priority assigned, the priorities being assigned by the host computer;

a controller controlling the main power supply of the printer such that when the power-on request signal has been received from the network, the main power supply is powered on and the power-on request signal is sent to the second printer having the next-lower priority assigned, and when a power switch of the printer is manually switched on and the power-on request signal has not been received, if the printer is the first printer then the main power supply is powered on, a power-on request signal is generated and the generated power-on request signal is sent to the second printer having the next-lower priority assigned, and if the printer is not the first printer, then a power-on request signal is generated and the generated power-on request signal is sent to the first printer having the highest priority assigned, wherein the plurality of the printers are sequentially switched on according to the assigned priorities without mediation of the host computer.

* * * * *